Dec. 13, 1960   J. W. MEULENDYK   2,964,023
FLOW FORCE COMPENSATED VALVE
Filed July 30, 1957   2 Sheets-Sheet 1

INVENTOR.
JOHN W. MEULENDYK
BY
ATTORNEY

United States Patent Office 2,964,023
Patented Dec. 13, 1960

2,964,023

FLOW FORCE COMPENSATED VALVE

John W. Meulendyk, Kalamazoo, Mich., assignor, by mesne assignments, to Pneumo Dynamics Corporation, Cleveland, Ohio, a corporation of Delaware Filed July 30, 1957, Ser. No. 675,128

7 Claims. (Cl. 121—46.5)

This invention relates to control valves and more particularly to a control valve having means to eliminate hydraulic unbalance forces.

In spool valves, disc valves and the like the static fluid pressure forces are normally balanced by providing opposed symmetrical porting, however dynamic flow forces still create unbalance. The flow of fluid through such valves produces centering forces which create difficulty when the valve must be operated by small control forces and are particularly troublesome when the valve operating forces originate in electronic equipment. If the output of the electronic equipment must provide large control forces, more expensive and complicated circuitry must be used. To overcome this, in the past it has been the practice to use two-stage control valves wherein the first stage operates as a hydraulic amplifier so that small electrical signals can be used to control the first stage and that stage in turn controls a second or power stage of the valve. This solution makes it possible to use relatively simple electronic equipment but complicates the valve structure. A valve according to this invention solves the problem by eliminating the source of the problem in that the valve is not subject to hydraulic centering forces of appreciable magnitude and can therefore be operated by the small control forces. It should be understood that such a valve can be used in any application wherein it is desirable to operate the valve with small control forces and that it is not my intention to limit this invention to valves which are operated by electronic control signals.

It is an important object of this invention to provide a flow control valve wherein the hydraulic flow forces in the valve are substantially balanced in all positions of operation.

It is another important object of this invention to provide a flow control valve capable of controlling large flow rates which valve can be operated by small control forces throughout its entire operating range.

It is another important object of this invention to provide a flow control valve wherein the hydraulic centering forces can be arranged to have substantially any desired positive or negative magnitude.

Further objects and advantages will appear from the following description and drawings, wherein.

Figure 1:
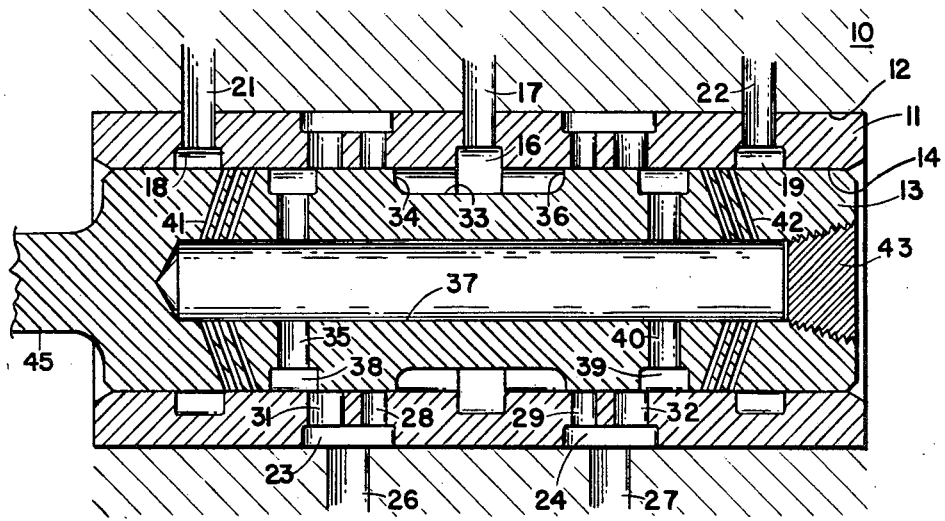
Figure 1 is a longitudinal section of a preferred spool valve shown in the neutral or off position.
Figure 2:
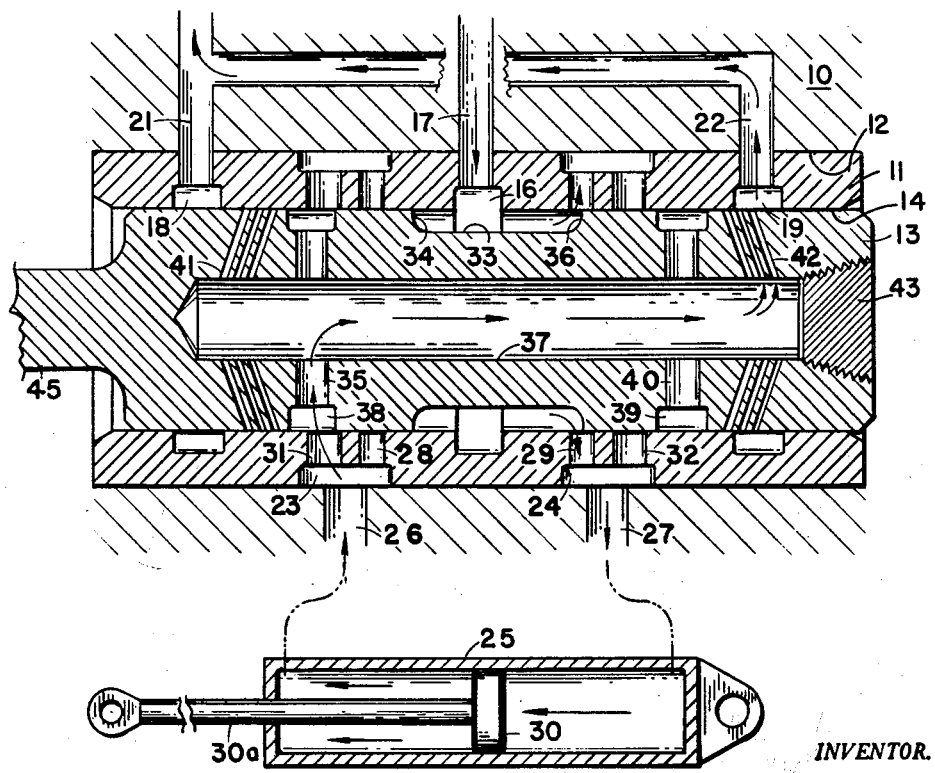
Figure 2 is a view similar to Figure 1 showing the valve schematically connected to a conventional fluid motor wherein the valve spool is in one operating position.

Referring to the Figures 1 and 2 the valve includes a body assembly 9 comprising a valve body 10 and a sleeve 11 extending through a bore 12 in the body 10. A spool or movable member 13 is slidable in a bore 14 formed in the sleeve 11. The sleeve 11 is formed with an annular inlet groove 16 opened to a source of fluid under pressure through an inlet port 17 and internal annular return grooves 18 and 19 with one on either side of the inlet groove 16. Each of the return grooves 18 and 19 is connected to a reservoir returning through return ports 21 and 22 respectively. The sleeve 11 is also formed with two spaced external annular grooves 23 and 24 which are connected to a fluid motor through body control ports 26 and 27 respectively.

In Figure 2 the valve is shown as it would be used to control a simple fluid motor having a cylinder 25 and a piston 30. In this case the opposite ends of the cylinder are connected to the control ports 26 and 27. It should be understood that the illustrated fluid motor is shown only as one of the many types of devices that can be controlled by the valve and is not intended to limit the valve to such applications.

Each of the external grooves 23 and 24 is connected to the bore 14 of the sleeve 11 through a plurality of symmetrically arranged metering orifices 28 and 29 respectively. In addition there are a plurality of return passages 31 and 32 extending from the external grooves 23 and 24 respectively to the bore 14. The spool 13 is formed with an external inlet groove 33 which is in registry with the inlet groove 16 in the sleeve 11 in all positions of valve operation and terminates in side walls 34 and 36 slightly spaced from the metering orifices 28 and 29 respectively when the spool is in the neutral position of Figure 1. The spool is also formed with external grooves 38 and 39 one of which is on each side of the groove 33 and both of which are in communication with a central bore 37 through radial passages 35 and 40 respectively. The various elements are proportioned so that the grooves 38 and 39 are in fluid communication with the associated return passages 31 and 32 when the spool is in the neutral position. Therefore the two ends of the cylinder 25 are connected together through the passages 31 and 32 and grooves 38 and 39 when the spool is in the neutral position of Figure 1.

To eliminate the centering hydraulic force which will be discussed in more detail below, the spool is also formed with two groups of inclined passages 41 and 42 associated with the return grooves 18 and 19 respectively.

These inclined passages 41 and 42 are arranged so that they are open to the central bore 37 and are isolated from the associated return grooves 18 and 19 when the valve is in the neutral position of Figure 1 but selectively move into registry with the associated internal grooves when the valve is operated. The inclined passages 41 and 42 are formed with a small diameter and are arranged so that the additional passages move into communication with the associated return groove as the spool 11 moves away from the neutral position. To close the bore 37 a plug 43 is threaded into its open end and the spool 13 is formed with a projection 45 which can be connected to the associated equipment which produces the control force to operate the spool. If the valve is to be controlled by electronic equipment the projection 45 would normally be connected to an electric force motor.

In order to understand the operation of this valve a short discussion of the flow characteristics through valves will be desirable. When fluid flows through an orifice of the type existing at the connection between the groove 33 and any of the metering orifices 28 or 29 the direction of flow is inclined relative to the axis of the valve. This inclined direction of flow introduces an axial component to the flow and thereby produces a reaction force on the spool which tends to move the spool toward the neutral or off position. This centering reaction force is well known to those skilled in the art and is discussed in detail in the United States patent to Shih-Ying Lee No.

2,747,612. Reference should be made to this patent for a more detailed description of the centering force theory. It has been found that if the edges of the orifice are sharp and the valve is properly designed the direction of flow at the metering point is inclined relative the axis of the valve by approximately 69 degrees and that the reaction force acting on the spool is a function of the product of the mass flow, the velocity of flow, and the angle of inclination of the flow. Since the angle of inclination remains substantially constant for most orifice configuration the centering force is a function of the mass flow and the flow velocity through the orifice. Therefore as the valve is operated to positions of greater flow a larger centering force is encountered.

Referring now to Figure 2 when the spool 13 is moved to the right the inlet groove 33 is brought into communication with the inlet orifices 29 with the amount of communication being proportional to the displacement of the spool from the neutral position. At the same time the groove 39 is moved to a position wherein it is isolated from the return passages 32, therefore the right end of the cylinder 25 is brought into fluid communication with the inlet 17 and at the same time is isolated from the central bore 37. This produces flow from the inlet 17 to the right end of the cylinder 25 which causes the piston 30 to move to the left and displace fluid out of the left end of the cylinder 25. The fluid displaced out of the left end of the cylinder 25 must flow to the reservoir return port 22. This return flow passes through the return passage 31, the external groove 38, the radial passage 35, the bore 37, the inclined passages 42, and the internal groove 19. It is assumed that the cross sectional area of the piston rod 30a is small when compared with the cross sectional area of the piston 30 so the volume of mass flow back to the reservoir will be essentially equal to the mass flow of fluid through the inlet side of the valve.

The flow of fluid from the external inlet groove 33 and the orifices 29 produces a centering force urging the spool 13 toward the neutral position. In the case where the spool is moved to the right as shown in Figure 2 the centering force operates to urge the spool to the left. In order to overcome this centering force I form the return circuits so that a decentering force is developed which is substantially equal and opposite to the centering force. This decentering force is developed in the inclined passages 42. The flow through the return passages 31 does not produce a centering force because substantially unrestricted communication is provided between these passages and the external groove 38 and as a result low velocities are present at this point. Since the velocity is low no centering force of any consequence is developed by the return flow at this location. Normally the inclined passages 42 are inclined relative to the valve axis by the same angle as the angle of inclination of the flow into the metering orifices 29. As described above this angle of inclination of flow into the metering orifices 29 is substantially 69 degrees so the inclined passages 42 are preferably formed at an angle of inclination 69 degrees from the axis of the spool 13. The inclined passages 42 are also arranged so that more passages are progressively moved into communication with the return groove 19 as the spool 13 is moved to positions of greater displacement from the neutral position.

It is necessary to use a plurality of small diameter passages instead of a single larger diameter passage to obtain proper decentering force. This is because the flow through a partially opened passage will be deflected in a direction which would produce a centering force even though the passages are inclined. However once a given inclined passage is substantially open, the flow therethrough will develop a decentering force. By using the structure including a plurality of small diameter passages which are progressively opened I am able to minimize the development of the centering force. In other words each passage is partially opened for only a small spool movement and the rest of the passages are either fully open or fully closed. If the angle of inclination of the passages is substantially 69° they should be arranged so that the sum of effective areas of all of the passages 42 in communication with the return groove 19 in any given position of the spool 13 will be substantially equal to the effective area of the opening between the inlet groove 33 and the orifices 29, so that the velocity of the fluid flow through the passages 42 will be substantially equal to the velocity of flow into the orifices 29. Since substantially the same amount of fluid flows through the return circuit as through the inlet circuit the mass flow through the passages 42 is substantially equal to the mass flow into the orifices 29. The inclined passages 42 are inclined in a direction opposite to the angle of inclination of the flow into the orifices 29, therefore a decentering force will be developed by the flow through the passages 42 which has a value substantially equal to the centering force at the inlet portion of the valve. In other words the decentering force is a function of the velocity, the mass flow, and the angle of inclination of the flow through the passages 42 and the centering force is a function of the same factors when considered in connection with the inlet. Expressed mathematically, the product of the inlet mass flow, the inlet velocity and the cosine of the angle of inclination of the inlet flow determines the centering force. At the same time the product of the outlet mass flow, the outlet velocity and the cosine of the angle of inclination of the outlet flow determines the decentering force. This can be expressed as the formulas:

$$F_c = M_i V_i \cos A_i$$

and $$F_d = M_o V_o \cos A_o$$

wherein $F_c$=the centering force; $F_d$=the decentering force; $M_i$=the inlet mass flow; $M_o$=the outlet mass flow; $V_i$=the inlet flow velocity; $V_o$=the outlet flow velocity; $A_i$=the inlet angle of inclination; and $A_o$=the outlet angle of inclination. As mentioned previously when the valve is used to control a normal fluid motor the mass flow of the inlet is substantially equal to the outlet mass flow so;

$$M_i = M_o$$

Also if the valve is properly designed $A_i$=69 degrees so if the valve is to be balanced so that $F_c=F_d$ then, $V_i$ cosine 69°=$V_o$ cosine $A_o$. If, however, it is desired to make the decentering force smaller than the centering force $V_i$ cosine $A_i > V_o$ cosine $A_o$, or if the decentering force is to be larger than the centering force then $V_i$ cosine $A_i < V_o$ cosine $A_o$. The latter would normally not be done since such a valve would be unstable. From the above it can be seen than any desired dynamic balance can be built into a valve by simply arranging the angle of inclination and the effective area of the passages 42 so that the product of the flow velocity times the cosine of the angle of inclination has the desired relationship to the inlet portion of the valve. If the effective area of the passages is increased then the velocity of flow therethrough decreases and if their effective area is decreased then the velocity of flow increases. In normal practice it is desired to arrange the valve so that there is a slight net centering force so that the flow will be a function of the control signal. Therefore the angle of inclination of the passages 42 and their size is arranged to produce a decentering force slightly smaller than the centering force.

Only the operation resulting from movement of the spool 13 to the right has been discussed thus far but it should be understood that movement of the spool to the left will cause the opposite fluid connections and that the centering and decentering operation will be the same. When the spool 13 is moved to the left, the left end of the cylinder 25 is brought into communication with the inlet port 17 through the metering orifices 28 and the right end of the cylinder is brought into fluid communication with the reservoir return port 21 through the inclined passages 41. Since the valve is completely symmetrical the operation in both directions is similar, so the discussion above in connection with movement of the spool 13 to the right applies equally to the operation which occurs when the spool 13 is moved to the left.

Figure 3:
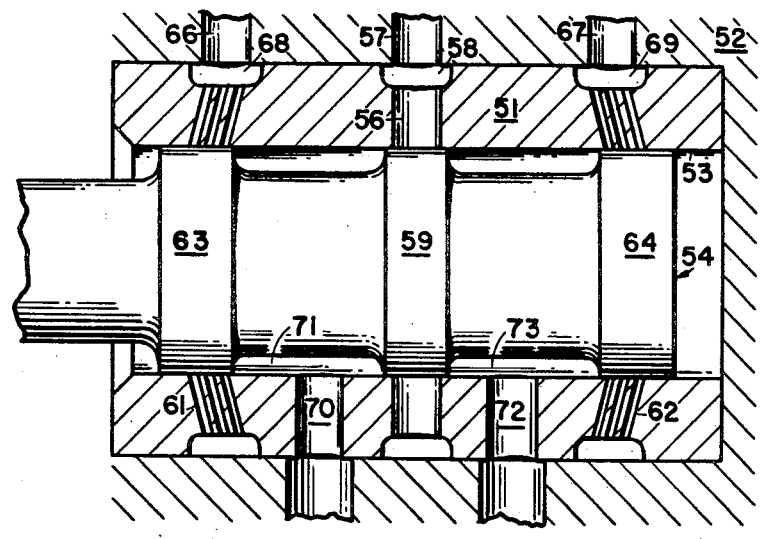
Figure 3 is a longitudinal section of a second embodiment of a spool valve incorporating this invention; and, Figure 4 is a view similar to Figure 3 showing the second embodiment valve in an operating position.
Figure 4:
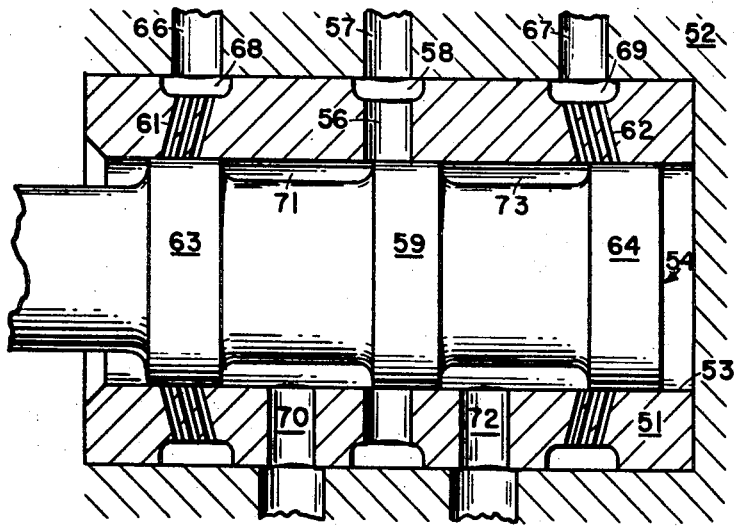

In the embodiment shown in Figures 3 and 4 a somewhat simplified structure is used. In this case, however, the operation principle is the same as discussed in connection to the embodiment shown in Figures 1 and 2. In this second embodiment a sleeve 51 is positioned within a body 52 and is provided with a bore 53 in which a spool 54 is free to move. The sleeve is formed with inlet orifices 56 connected to a source of fluid under pressure through an inlet passage 57 and an external annular groove 58. The spool 54 is provided with a central land 59 which covers the orifices 56 when the valve is in the neutral position of Figure 3. In this case inclined passages 61 and 62 are formed in the sleeve 51 on either side of the orifices 56 and are closed by end lands 63 and 64 respectively formed on the spool 54 when the spool is in the neutral position. The inclined passages 61 and 62 connect the associated reservoir return ports 66 and 67 through annular grooves 68 and 69 respectively formed on the sleeve 51. The sleeve is provided with a first control port 70 in communication with a zone 71 of the spool 54 between the lands 59 and 63 and a second control port 72 opens to a zone 73 between the lands 59 and 64. The control ports 70 and 72 would be connected to a fluid motor in the same manner as the ports 26 and 27 of the first embodiment. When the spool 54 is in the neutral position of Figure 3, the control ports 70 and 72 are isolated from each other and from the source of pressure and reservoir return. If, however, the spool 54 is moved to the right as shown in Figure 4 the orifices 56 are brought into communication with the zone 71 and in turn the control port 70. The flow out of the orifices 56 will be inclined relative to the axis of the spool and will produce a centering force as described above in connection with the first embodiment. The return flow through the control port 72, the zone 73, and the inclined passages 62 is again substantially equal in volume to the inlet flow. Therefore a decentering force is developed by the flow through the inclined passages 62 which opposes the centering force developed by the inlet flow. Here again the effective area of the passages 62 in communication with the zone 73 in any given spool position will normally be substantially equal to the effective area of flow out of the orifices 56 past the land 59. In such cases of inclination of the passages 62 should be substantially equal to and opposite to the angle of inclination of the flow out of the orifices 56. These conditions of course should only be present if the dynamic flow is to produce substantially no unbalance on the spool 54.

By using the structures shown in either of the embodiments it is possible to provide a balanced valve wherein standard machining operations are used to the fullest extent and even though these machining operations must be accurately performed the cost of manufacture will not be unreasonably high.

Although the preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. A valve comprising a body member formed with a cavity and inlet and outlet ports, a movable member in said cavity movable along a line from a neutral position, first metering means on said members controlling the rate of flow and deflecting the flow through said inlet port in a first direction inclined relative to said line, second metering means on said members controlling the rate of flow and deflecting the flow through said outlet ports in a second direction inclined relative to said line, one of said means including a plurality of passages inclined relative to said line open to the surface of said cavity through which fluid flows in one of said directions, the flow through said one means producing a force urging said movable member away from said neutral position and the flow through the other of said means producing a force urging said movable member toward said neutral position.

2. A valve comprising a body member formed with a cavity and first and second ports, a movable member in said cavity movable along a line from a neutral position, first means on said members controlling flow through said first port deflecting such flow in a first direction inclined relative to said line when said movable member is spaced from said neutral position, one of said members being formed with a plurality of passages associated with a said second port inclined relative to said line and open to the surface of said cavity, means on the other of said members closing said passages when said movable member is in said neutral position and progressively opening said passages to flow as said movable member moves away from said neutral position, the flow through said first port producing a force urging said movable member toward said neutral position and the flow through said second port producing a second force urging said movable member away from said neutral position.

3. A valve comprising a body member formed with a cavity and first and second ports, a movable member in said cavity movable along a line from a neutral position wherein it prevents flow through said ports, first means on said members controlling flow through said first port deflecting such flow in a first direction inclined relative to said line when said movable member is spaced from said neutral position, one of said members being formed with a plurality of passages associated with said second port inclined relative to said line in a second direction and open to the surface of said cavity, means on the other of said members closing said passages when said movable member is in said neutral position and progressively opening said passages to flow as said movable member moves away from said neutral position, the axial component of the flow in said first direction times the velocity of such flow being a controlled function of the axial component of flow in said second direction times the velocity of such flow.

4. A valve comprising a body member formed with a cavity and first and second ports, a movable member in said cavity movable along a line from a neutral position wherein it prevents flow through said ports, first means on one of said members controlling the flow through said first port deflecting such flow in a first direction inclined relative to said line when said movable member is spaced from said neutral position, one of said members being formed with a plurality of passages associated with said second port inclined relative to said line by an angle substantially equal to the angle of inclination of said first direction and open to the surface of said cavity, means on the other of said member closing said parallel passages when said movable member moves away from said neutral position, the effective flow area of said first means being substantially equal to the sum of the effective areas of said open passages in all positions of said movable member.

5. A valve comprising a body member formed with a cavity, a movable member in said cavity movable along a line from a neutral position, orifice means on one of said members, a land on the other of said members controlling the flow through said orifice means and deflecting such a flow in a first direction inclined relative to said line when said movable member is spaced from said neutral position, a plurality of parallel passages open to the surface of said cavity inclined relative to said line by an angle substantially equal to the angle of inclination of said first direction connected in series with said orifice means, means closing said parallel passages when said movable member is in said neutral position and progressively opening said passages to flow as said movable member moves away from said neutral position, the effective flow area of said orifice means being substantially equal to the sum of the effective areas of said open passages in all positions of said movable member.

6. A valve comprising a body formed with a bore, a spool in said bore movable along the axis of said bore from a neutral position, inlet orifice means on said body, a land on the spool controlling the flow through said orifice means deflecting such a flow in a first direction inclined relative to said axis when said spool is spaced from said neutral position, a plurality of parallel outlet passages open to the surface of said bore inclined relative to said axis by an angle substantially equal to the angle of inclination of said first direction connected in series with said inlet orifice means, means closing said parallel passages when said spool is in said neutral position and progressively opening said passages to flow as said spool moves away from said neutral position, the effective flow area of said orifice means being substantially equal to the sum of the effective areas of said open passages in all positions of said spool.

7. A valve comprising a body formed with a bore and inlet and outlet ports open to said bore, a pair of controlled ports in said body open to said bore adapted to be connected to a fluid device, a spool movable in said bore along the axis thereof from a neutral position, a main passage in said spool in communication with both of said controlled ports when said spool is in said neutral position and isolated from one of said controlled ports when said spool is spaced from said neutral position, a plurality of parallel passages in said spool opening between said main passage and the surface of said spool, said parallel passages being isolated from said outlet port when said spool is in said neutral position and progressively moved into communication with said outlet port when said spool moves away from said neutral position, land means on said spool isolating said inlet port from said controlled ports when said spool is in said neutral position and opening said inlet port to communication with said one controlled port when said spool is spaced from said neutral position, the flow through said inlet port producing a force urging said spool away from said neutral position, said parallel passages being inclined relative to said axis whereby flow therethrough produces a force urging said spool away from said neutral position.

References Cited in the file of this patent

UNITED STATES PATENTS

| | | |
|---|---|---|
| 789,026 | Huston | May 2, 1905 |
| 2,357,986 | Wichterman | Sept. 12, 1944 |
| 2,631,571 | Parker | Mar. 17, 1953 |
| 2,648,313 | Clifton | Aug. 11, 1953 |
| 2,751,752 | Metcalf | June 26, 1956 |
| 2,826,258 | Livers | Mar. 11, 1958 |
| 2,852,039 | Dotter | Sept. 16, 1958 |
| 2,862,518 | McAlvay | Dec. 2, 1958 |

FOREIGN PATENTS

| | | |
|---|---|---|
| 120,249 | Australia | Aug. 6, 1945 |